March 23, 1965
C. S. DOHERTY ETAL
3,174,331
MOTION SENSING DEVICES
Filed July 13, 1962
2 Sheets-Sheet 2
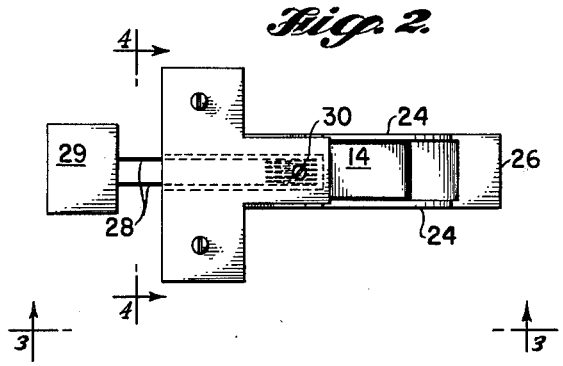
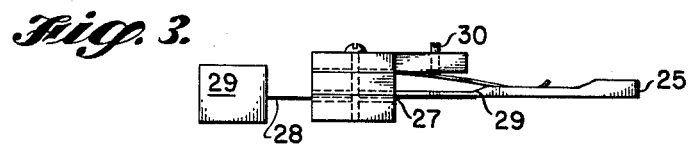
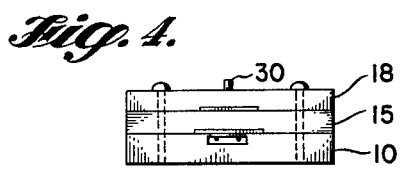
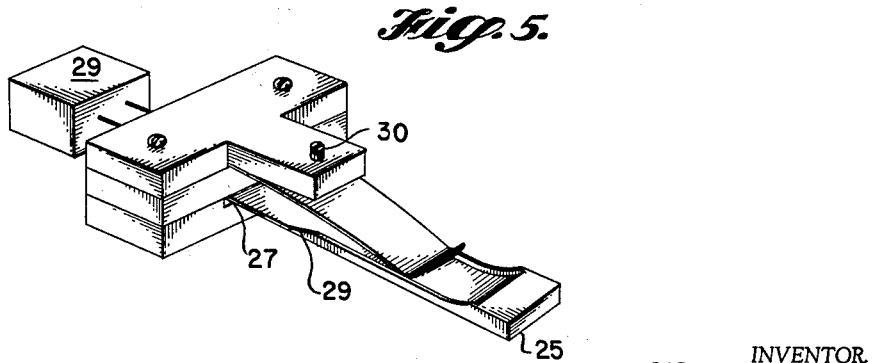
INVENTOR.
CARL S. DOHERTY
GEORGE E. RAWIE
BY
*K. W. Thomas*
ATTORNEY

United States Patent Office 3,174,331
Patented Mar. 23, 1965

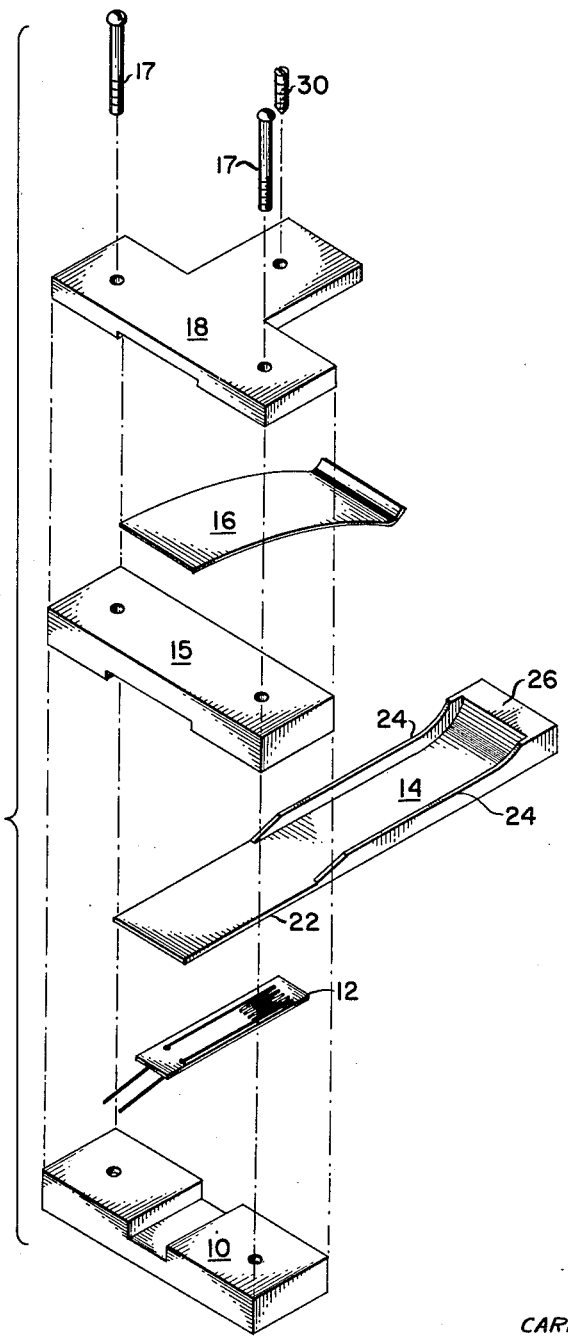

3,174,331
MOTION SENSING DEVICES
Carl S. Doherty, Seattle, and George E. Rawie, Kent, Wash., assignors to The Boeing Company, Seattle, Wash., a corporation of Delaware
Filed July 13, 1962, Ser. No. 209,692
3 Claims. (Cl. 73—70.2)

This invention relates to a motion sensing device, and more particularly to a device which will sense displacement, velocity and acceleration of a member subjected to vibrational forces.

In aircraft or space vehicles, it is important to know the movement of structural panels which are subjected to vibrational forces over a wide range of frequencies and over a broad range of operational temperatures. Previously used vibrometers, accelerometers and displacement pick-up devices have proven unsatisfactory because of inaccuracies at elevated temperatures (above 500° F.), because the mass of the device damped the true vibratory mode of the panel, or because they had a limited range of operational frequency.

It is an object of this invention to provide a motion sensing device which will operate over a broad range of vibrational frequencies and at elevated temperatures such as 1450° F.

A further object of this invention is to provide a device as above described that may be attached to a structural panel at the point or points where motion is to be sensed, yet being sufficiently lightweight so as not to appreciably distort the true movement of the panel.

The foregoing objects are realized according to this invention by providing certain modifications to a cantilever beam. The cantilever principle forms the essence of many types of motion-sensing devices. When used for this purpose, the motion of any member subjected to vibrational forces is transmitted to the cantilever beam through a mounting block fixedly attached at one end of the beam, commonly called the root. A strain gauge or semi-conductor attached to the beam will vary an electrical signal which will be proportional to the relative motion between the root and the free end of the beam, which motion is in turn proportional to or the same as the motion of the vibrating member to which the mounting block is attached. The electrical signal from the strain gauge or semi-conductor is fed into electrical devices suitable for providing the observer with the desired information concerning the motion of the vibrating member. By the proper selection of the electrical devices, the electrical signal from the strain gauge or semi-conductor will effect an indication of values related to the displacement, velocity or acceleration of the vibrating member. The location of the strain gauge is usually at the point of maximum stress in the beam.

The inherent properties of a cantilever beam are such that the phenomenon of harmonic motion occurs at certain values of the frequency of oscillation of the beam. The harmonic or natural frequencies of a cantilever beam are commonly referred to as the first, or fundamental, natural frequency, the second natural frequency, the third natural frequency, and so on with increasing values of the frequency of oscillation.

When the frequency of vibration of the structure under study is equal to any one of the natural frequencies of the sensing device, the amplitude of vibration of the cantilever beam becomes magnified and the device does not indicate the true motion of the vibrating structure.

At the fundamental frequency, the beam is subjected to simple bending from the root to the free end of the beam. At the second natural frequency the beam assumes a node shape, with the node point being located approximately 70% of the length of the beam from the root thereof.

Under these conditions, the amplitude of oscillation of the cantilever beam will tend to approach infinity, and unless the damping forces inherent in the system are great enough, the device will destroy itself. Since it is desirable to have minimum damping forces inherent in the beam, artificial damping means must be provided external of the beam. Such means are provided so that the damping forces are applied only when necessary to prevent the amplitude of the cantilever beam from becoming large enough to be harmful to the device.

The modifications contemplated by this invention result in spreading apart the values of the fundamental and the second natural frequencies so that the device will accurately sense the motion of a vibrating member over a broad range of frequency. This spreading apart of the fundamental and second natural frequencies is accomplished by using a beam of non-uniform cross-sectional area. For a beam with constant bending stiffness over its length, or for a homogeneous beam of uniform cross-sectional area, the ratio of the second to the first natural frequency is 22.0/3.52=6.24.[1] By altering the cross-sectional area of the beam in accordance with the teachings of this invention, it is possible to increase this ratio to values of 25 and above, thus allowing a broad frequency range over which the vibratory motion may accurately be sensed. In actual practice, second natural frequencies of 900 cycles per second have been attained, and for the same beam the fundamental frequency was approximately 35 cycles per second.

In the drawings:

FIGURE 1 is an exploded isometric view of a displacement pick-up device embodying the principles of this invention.

FIGURE 2 is a plan view of the assembled device illustrated in FIGURE 1.

FIGURE 3 is a side elevational view taken on line 3—3 of FIGURE 2.

FIGURE 4 is an end elevational view taken on line 4—4 of FIGURE 2.

FIGURE 5 is a perspective view of the assembled device.

Referring first to the isometric view in FIGURE 1, this device is shown to be comprised of a mounting block 10, a high temperature foil type strain gauge or semi-conductor 12, a beam member 14, spacer plate 15, damping leaf 16, and clamping plate 18.

The beam 14 has, in this case, been machined from a solid block of material to a suitable uniform thickness 22, leaving stiffening members 24 and the mass block 26 to be of sizes and dimensions suitable for the intended use. The screws 17 fasten the device in assembled form so that the beam 14 is fixedly attached to the mounting block 10. However, it is to be understood that the beam 14 may be attached to the mounting block 10 by being machined from a single piece of metal so as to be an integral member; or, in fact, the beam may be attached by welding or other means directly to the vibrating member without the need for a mounting block.

Referring now to FIGURES 2 to 5 showing the device as assembled, it may be mounted to a vibrating member by attaching the mounting block 10 thereto by use of clamps, machine screws, adhesives or other suitable means. Strain gauge or semi-conductor leads 28 are connected to the desired indicating means 29 which functions to provide visual or recorded values related to the displacement, velocity or acceleration of the vibrating member, and set screw 30 is adjusted so that the leaf 16 will restrain or limit the motion of the beam 14 during

---

[1] Hartog, Den, Mechanical Vibrations, 3rd edition, published by McGraw-Hill, 1947, page 192, see Figure 120.

transition through a natural frequency of the cantilever beam.

When it is desired to know the distorted shape of a vibrating structural member, such as a panel section of an airframe or missile, a number of these motion sensing devices are attached to the surface of the panel in a suitable pattern so that a true picture of the actual deflections of the panel may be obtained. The panel may be set in vibrating motion on a test table, in a wind tunnel, or even under actual flight conditions. With the indicating means 29 connected to their respective motion sensing devices the outputs of the various indicating means 29 may be recorded to show the true vibration mode shape of the panel at any instant of time. Of course, output signals from the motion sensing device are first calibrated against the known vibration characteristics of a test table.

In operation, the mass block 26 at the free end of the beam 14 lowers the fundamental frequency below that which it would have been for a beam of like material and uniform cross-sectional area. The stiffening members 24 greatly increase the second natural frequency above that which it would have been for a beam of like material and uniform cross-sectional area.

The stiffening members 24 extend from the free end of the beam 14, toward the root 27, stopping at a point 29 along the beam. The location of the point 29 is critical in that it must be far enough from the root 27 so as not to significantly raise the fundamental frequency of the beam 14, yet be far enough from the free end 25 so that the stiffening members 24 appreciably stiffen the beam in the second bending mode which occurs at the second natural frequency.

A beam of non-uniform cross-sectional area as shown herein was made of 2024 aluminum, and a frequency ratio $(f_2/f_1)$ of 28.2 was attained. In this case, the thickness 22 was machined to 0.003 inch, the stiffening rails 24 were of an overall thickness of 0.050 inch and the length of the beam from root to tip was 0.600 inch. The point 29 was located 0.150 inch from the root 27. The point 29 was determined empirically and was located at a distance from the root of ¼ the length of the beam from root to tip. If the stiffening rails extended the full length of the beam, the cross-sectional area would be uniform and consequently the frequency ratio would be 6.24 as noted above in the Hartog reference. If the rails did not extend through the node point of the second natural frequency they would not be effective in raising the value of the second natural frequency. It was found that the distance from the root of ¼ the length of the beam as the termination point for the rails 24 did, in this particular case, greatly increase the second natural frequency without having an equal effect on the fundamental frequency. Although the fundamental frequency was in fact increased somewhat, the addition of the mass 26 lowered both the fundamental and second natural frequencies, thereby allowing the device to operate at lower absolute values of frequency.

We claim:
1. A motion sensing device comprising a cantilever beam of non-uniform cross-section having a root and a free end, sensing means for sensing the relative motion between the root and the free end of said beam, a mass at the free end of said beam for decreasing the fundamental frequency, and stiffening members extending longitudinally along a portion of said beam for increasing the second natural frequency of said beam.

2. A motion sensing device comprising a cantilever beam of non-uniform cross-section having a root and free end, damping means for limiting the amplitude of the relative motion between the root and the free end of said beam, sensing means for sensing the relative motion between the root and the free end of said beam, a mass at the free end of said beam for decreasing the fundamental frequency, and stiffening members extending longitudinally along a portion of said beam for increasing the second natural frequency of said beam.

3. A motion sensing device comprising a cantilever beam of non-uniform cross section having a root and a free end, sensing means for sensing the relative motion between the root and the free end of said beam, a mass at the free end of said beam for decreasing the fundamental frequency, and stiffening members extending longitudinally along said beam from the free end of said beam toward the root of said beam stopping at a point that is far enough from the root of said beam so as not to significantly raise the fundamental frequency of said beam, and yet far enough from the free end of said beam so that said stiffening members appreciable stiffen said beam in the second bending mode which occurs at the second natural frequency of said beam.

References Cited by the Examiner
UNITED STATES PATENTS

| | | | |
|---|---|---|---|
| 2,219,803 | 10/40 | Bourne | 175—368 |
| 2,722,614 | 11/55 | Fryklund | 73—71.2 |
| 2,741,675 | 4/56 | Chase et al. | 73—70.2 |
| 3,071,007 | 1/63 | Bjorn et al. | 73—70.2 |

OTHER REFERENCES

Page 192, Mechanical Vibrations, 3rd edition, by Den Hartog, published by McGraw-Hill in 1947.

Page 269, Advanced Dynamics, by Timoshenko and Young, published by McGraw-Hill in 1948.

RICHARD C. QUEISSER, *Primary Examiner.*

ROBERT L. EVANS, *Examiner.*